May 22, 1951

R. ADLER 2,553,735

PUSH-PULL OUTPUT TUBE

Filed Jan. 21, 1950

ROBERT ADLER
*INVENTOR.*

BY Francis W. Crotty
HIS ATTORNEY

Patented May 22, 1951

2,553,735

UNITED STATES PATENT OFFICE 2,553,735

PUSH-PULL OUTPUT TUBE

Robert Adler, Chicago, Ill., assignor to Zenith Radio Corporation, a corporation of Illinois Application January 21, 1950, Serial No. 139,910

3 Claims. (Cl. 250—151)

Figures 1, 2:
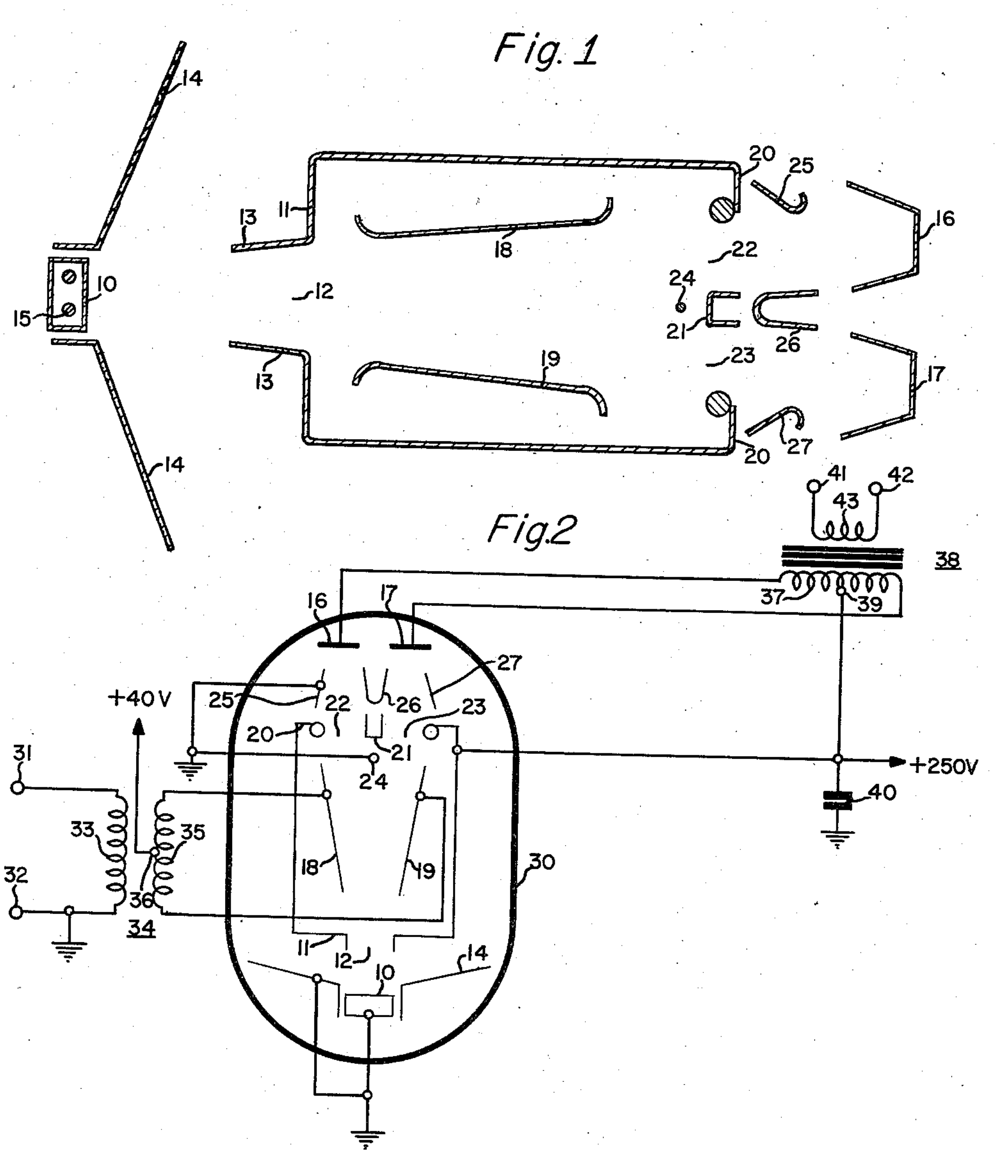

This invention relates to deflection-control electron-discharge devices and more particularly to deflection-control push-pull output tubes.

The advantages of push-pull amplifiers are well known and such amplifiers find numerous applications in the art, as for example in the audio output stages of a radio receiver. However, to obtain the advantages of push-pull operation, conventional practice has been to use a pair of beam-power pentodes or equivalent tubes. With a pair of beam-power pentodes, the anode voltages may differ widely without affecting the magnitude of the output signal current for a given input signal voltage, so that high power amplification efficiencies may be attained.

It is well known that a single electron-discharge device of the deflection-control type may be utilized to provide push-pull output signals by transversely deflecting a formed electron beam across a pair of transversely adjacent anodes in accordance with an input signal and by connecting a balanced load between the two anodes. However, deflection-control tubes have not been used as push-pull power amplifiers in commercial applications, in spite of the fact that such tubes are inherently adapted to balanced operation and are capable of providing push-pull amplification in a single electron-discharge system, for the primary reason that the balanced signals produced at the anodes of a conventional deflection-control tube induce transverse electrostatic fields in a direction to counteract the beam deflection effected by the input signal, thereby reducing the deflection sensitivity and the power amplification efficiency.

It is therefore an object of the present invention to provide a novel and improved push-pull power output tube of the deflection-control type.

It is a further object of the invention to provide a novel deflection-control push-pull power output tube having a power amplification efficiency substantially equivalent to that of a pair of beam-power pentodes connected in a conventional push-pull power amplifier circuit.

It is yet another object of the invention to provide an improved deflection-control push-pull power output tube capable of providing power amplification substantially equivalent to that of a conventional balanced push-pull power amplifier utilizing a pair of beam-power pentodes without exceeding commercially practical distortion limits.

In accordance with the present invention, a novel and improved push-pull power output tube comprises an electron gun for projecting a formed electron beam. The device also includes a pair of anodes respectively having active portions on opposite sides of, and transversely spaced with respect to, the path of the beam. An accelerating electrode is positioned transversely of the beam-path intermediate the electron gun and the anodes, and the accelerating electrode is impervious to electrons except for openings affording electron-access to the respective anodes.

A beam-splitting element is positioned between the electron gun and the accelerating electrode in the path of the projected beam to divide the beam into two portions which are directed to the respective anodes by the accelerating electrode openings. Beam-confining electrodes are positioned intermediate the accelerating electrode openings and the output anodes and are maintained at substantially cathode potential.

The features of the present invention which are believed to be novel are set forth with particularity in the appended claims. The invention, together with further objects and advantages thereof, may more readily be understood, however, by reference to the following description taken in connection with the accompanying drawing, in the several figures of which like reference numerals indicate like elements, and in which:

Figure 1 is a sectional view of a deflection-control push-pull power output tube constructed in accordance with the invention, and Figure 2 is a schematic diagram of a push-pull power amplifier circuit embodying the device shown in Figure 1.

The electrode system shown in Figure 1 and constructed in accordance with the present invention comprises an electron gun including a cathode 10 and an accelerating electrode 11 having an aperture 12 defined by flanges 13 extending toward the cathode. An auxiliary electrode 14 is disposed adjacent cathode 10 to aid the beam formation and a heater element 15 is provided for energizing cathode 10.

The electron gun per se is of well known construction and constitutes no part of the present invention. Other types of electron gun may be used, one particular construction which may be advantageous being disclosed and claimed in the copending application of Robert Adler, Serial No. 68,285, filed December 30, 1948, for Electron-Discharge Devices of the Focussed-Beam Type, and assigned to the present assignee.

A pair of anodes 16 and 17, respectively having active portions on opposite sides of the path of the beam projected by the electron gun, and transversely spaced with respect to the beam path, are provided to serve as output electrodes, and a pair of electrostatic-deflection electrodes 18 and 19 are disposed intermediate the electron gun and anodes 16 and 17 to function as input electrodes. Anodes 16 and 17 are preferably arranged symmetrically with respect to the path of the beam. The structure thus far described constitutes a conventional deflection-control electron-discharge device.

An accelerating electrode is positioned transversely of the beam-path intermediate the electron gun and the anodes. In the embodiment of Figure 1, the accelerating electrode comprises a flat sheet 20 having a large central aperture in the center of which is disposed a solid member 21 which is electrically connected to the accelerating electrode 20 and which serves effectively to define a pair of openings 22 and 23 affording electron-access to anodes 16 and 17 respectively. The accelerating electrode 20, 21 is impervious to electrons except for openings 22 and 23.

A beam-splitting element 24, positioned in the path of the beam projected from the electron gun, serves to divide the projected beam into two portions. Beam-confining elements 25, 26 and 27 are provided between openings 22 and 23 and anodes 16 and 17. Accelerating electrode apertures 22 and 23 and beam-confining elements 25, 26 and 27 constitute means for directing the beam portions on either side of the beam-splitting element 24 to anodes 16 and 17 respectively.

Preferably, in order to provide maximum power output, all of the electrodes are elongated in a direction perpendicular to the plane of the drawing, so that the electron beam is sheet-like and of substantially rectangular cross-section, and beam-splitting element 24 is conveniently constructed as a wire extending parallel to the cathode.

The electrode system is supported within a suitable envelope (not shown) which is evacuated, gettered, and based in a manner well known in the art. Auxiliary electrode 14, beam-splitting element 24, and beam-confining electrodes 25, 26 and 27 may conveniently be internally connected to cathode 10 for operation at a common potential therewith. Accelerating electrode 11 of the electron gun and members 20 may conveniently be formed as an integral structure for which a single external connection is provided. Other external connections are provided for cathode 10, heater element 15, anodes 16 and 17, and deflection electrodes 18 and 19.

Figure 2 is a schematic representation of a push-pull power amplifier circuit embodying an electron-discharge device 30 constructed as shown in Figure 1. Audio-frequency input signals from a suitable signal source (not shown) are applied between input terminals 31 and 32 connected across the primary winding 33 of an input transformer 34, and terminal 32 is connected to ground. The secondary winding 35 of input transformer 34 is connected between deflection electrodes 18 and 19, and a center tap 36 on secondary winding 35 is connected to a suitable source of positive unidirectional operating potential, which may be, for example, 40 volts. Cathode 10, auxiliary electrode 14, beam-splitting element 24, and beam-confining electrodes 25, 26 and 27 may all be connected to ground, although it may be desirable to operate beam-splitting element 24 at a positive unidirectional potential lower than the average anode potential, as, for example, about 20 volts. Anodes 16 and 17 are connected to the opposite terminals of the primary winding 37 of an output transformer 38, and a center tap 39 on primary winding 37 is connected to a source of suitable positive unidirectional operating potential, for example 250 volts, which is bypassed to ground by means of a condenser 40. Output terminals 41 and 42, connected to opposite terminals of the secondary winding 43 of output transformer 38, may be provided for applying the amplified balanced output signal developed across secondary winding 43 to further amplifying and/or utilizing means (not shown).

In operation, in the absence of an input signal between terminals 31 and 32, a formed electron beam is projected by the electron gun including cathode 10, accelerating electrode 11, and auxiliary electrode 14. The projected beam is divided into two portions by means of beam-splitting element 24, and the apertures 22 and 23 of accelerating electrode 20, 21 are disposed in register with the two beam portions so formed. The beam portions are directed respectively to output anodes 16 and 17 by means of accelerating apertures 22 and 23 and beam-confining electrodes 25, 26 and 27. Beam-confining electrodes 25, 26 and 27 serve to suppress secondary electrons originating at anodes 15 and 16.

When an audio-frequency input signal is applied between terminals 31 and 32, and thence between deflection electrodes 18 and 19, the beam is transversely deflected, and the distribution of the space electrons between output anodes 16 and 17 is thereby varied, in accordance with the input signal. Consequently, a balanced output signal is developed across primary winding 37 of output transformer 38.

Because of the special construction of the electron-discharge device 30, the instantaneous potentials of anodes 16 and 17 have a negligible effect upon the electron distribution between those anodes, and the anode voltages may swing widely without substantially affecting the deflection sensitivity. For example, at an instant when the entire beam is deflected to the left of beam-splitting element 24, it is directed to anode 16 by accelerating aperture 22 and beam-forming electrodes 25 and 26. The potential of anode 16 then drops to a minimum, while the potential of anode 17 rises to a maximum. Conversely, if at another instant the entire beam is deflected to the right of beam-splitting element 24, it is directed to anodes 17 by means of accelerating aperture 23 and beam-forming electrodes 26 and 27, and the potential of anode 17 drops to a minimum while that of anode 16 rises to a maximum. The provision of accelerating apertures 22 and 23 insures that the instantaneous potential difference between anodes 16 and 17 will have no substantial effect upon the electron distribution between those anodes, so that the full deflection sensitivity of the device is utilized and the maximum amplification efficiency is attained.

Preferably, deflection electrodes 18 and 19 are constructed and arranged with an increasing physical separation in the direction of electron travel and are operated at a lower average potential than accelerating electrodes 11 and 20, 21 and anodes 16 and 17. In this manner, the deflection electrodes 18 and 19 are caused to provide a proper beam-forming field so that the electron beam projected by the electron gun converges and then diverges without coming to a focus. With this arrangement, excellent linearity of the control characteristics is obtained.

While it is preferred to utilize electrostatic-deflection electrodes to provide transverse deflection of the electron beam in accordance with the input signal, it is, of course, also possible to apply the input signal to a magnetic-deflection coil (not shown) constructed and arranged to produce a magnetic-deflection field within the device in a direction parallel to cathode 10.

Merely by way of illustration, and in no sense by way of limitation, a power output of 1.6 watts has been obtained from a single-ended input voltage of 11 volts R. M. S. with a maximum of 5% distortion at a frequency of 1000 cycles per second, utilizing a total beam current of 13 milliamperes and an average voltage at the final anodes of 290 volts. This operation corresponds to a power efficiency of over 42%, which approaches the 50% theoretical maximum for Class A operation and is much greater than that obtainable with conventional deflection-control push-pull output tubes. The dynamic characteristic is equivalent to that of a pair of pentodes connected in push-pull.

Thus, the present invention provides a novel and improved push-pull output tube of the deflection-control type which provides a power efficiency comparable to that obtainable with circuits conventionally used in commercial radio apparatus and much greater than that heretofore obtainable with deflection-control output tubes. The structure is simple and well adapted to large scale production on a commercially practical basis.

While the invention has been shown and described in connection with a certain preferred embodiment thereof, it is apparent that numerous variations and modifications may be made, and it is contemplated in the appended claims to cover all such variations and modifications as fall within the true spirit and scope of the invention.

I claim:

1. A push-pull output tube comprising: an electron gun for projecting a formed electron beam; a beam-splitting element positioned in the path of said projected beam to divide said beam into two portions; a pair of anodes having active portions behind and respectively on opposite sides of said beam-splitting element; and means including an accelerating electrode impervious to electrons except for openings registering with said beam portions and beam-confining electrodes positioned intermediate said openings and said anodes and maintained at substantially cathode potential for directing said beam portions to said respective anodes.

2. A push-pull output tube comprising: an electron gun having an elongated cathode for projecting a formed sheet-like electron beam of substantially rectangular cross-section; a beam-splitting wire element parallel to said cathode, maintained at a direct-potential lower than that of said anode, and positioned in the path of said projected beam to divide said beam into two portions; a pair of anodes having active portions behind and respectively on opposite sides of said beam-splitting element; and means including an accelerating electrode impervious to electrons except for openings registering with said beam portions and beam-confining electrodes positioned intermediate said openings and said anodes and maintained at substantially cathode potential for directing said beam portions to said respective anodes.

3. A deflection-control push-pull output tube comprising: an electron gun having an elongated cathode for projecting a formed sheet-like electron beam of substantially rectangular cross-section; a beam-splitting wire element parallel to said cathode and positioned in the path of said projected beam to divide said beam into two transverse portions; a pair of anodes substantially symmetrically positioned with respect to said beam-splitting element; means including an accelerating electrode impervious to electrons except for openings registering with said beam portions and beam-confining electrodes positioned intermediate said openings and said anodes and maintained at substantially cathode potential for directing said beam portions to said respective anodes; and a pair of electrostatic-deflection electrodes positioned between said electron gun and said beam-splitting element for transversely deflecting said beam in response to an input signal.

ROBERT ADLER.

REFERENCES CITED

The following references are of record in the file of this patent:

UNITED STATES PATENTS

| Number | Name | Date |
|---|---|---|
| 2,159,818 | Plaistowe et al. | May 23, 1939 |
| 2,165,308 | Skellet | July 11, 1939 |
| 2,176,599 | Vingerhoets | Oct. 17, 1939 |
| 2,194,547 | Haines | Mar. 26, 1940 |
| 2,202,376 | Hansell | May 28, 1940 |
| 2,257,795 | Grey | Oct. 7, 1941 |
| 2,265,311 | Preisach | Dec. 9, 1941 |
| 2,305,617 | Hansell | Dec. 22, 1942 |
| 2,390,250 | Hansell | Dec. 4, 1945 |
| 2,393,803 | Nelson | Jan. 29, 1946 |
| 2,427,888 | Warren | Sept. 23, 1947 |
| 2,505,261 | Syrdal | Apr. 25, 1950 |
| 2,511,143 | Adler | June 13, 1950 |

FOREIGN PATENTS

| Number | Country | Date |
|---|---|---|
| 458,169 | Great Britain | Mar. 5, 1935 |